(12) United States Patent
Roberts et al.

(10) Patent No.: US 11,971,053 B2
(45) Date of Patent: Apr. 30, 2024

(54) ROTOR WITH BALANCING FEATURES AND BALANCING METHOD

(71) Applicant: Garrett Transportation I Inc, Torrance, CA (US)

(72) Inventors: Quentin Roberts, Chantraine (FR); Karunakaran Ealumalai, Bengaluru (IN); Razvan Nedelcu, Bucharest (RO); Alexandru-Silviu Stoicescu, Bucharest (RO); Alexandru Danicescu, Bucharest (RO); Bekir Adanir, London (GB)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 17/450,719

(22) Filed: Oct. 13, 2021

(65) Prior Publication Data

US 2023/0111525 A1 Apr. 13, 2023

(51) Int. Cl.
| | |
|---|---|
| F01D 5/02 | (2006.01) |
| F02C 6/12 | (2006.01) |
| F04D 29/28 | (2006.01) |
| F04D 29/66 | (2006.01) |
| G01M 1/34 | (2006.01) |

(52) U.S. Cl.
CPC ........... *F04D 29/662* (2013.01); *F01D 5/027* (2013.01); *F02C 6/12* (2013.01); *F04D 29/284* (2013.01); *G01M 1/34* (2013.01); *F05D 2220/40* (2013.01); *F05D 2250/70* (2013.01)

(58) Field of Classification Search
CPC ............................... F01D 5/027; F04D 29/662
See application file for complete search history.

(56) References Cited

U.S. PATENT DOCUMENTS

| | | | | |
|---|---|---|---|---|
| 7,189,062 B2 * | 3/2007 | Fukizawa | ............... | F04D 25/04 416/185 |
| 8,936,439 B2 * | 1/2015 | Duong | .................... | F01D 5/048 416/185 |
| 9,217,331 B1 * | 12/2015 | Yellapragada | ......... | B33Y 80/00 |
| 9,260,971 B2 * | 2/2016 | Yoshida | .................. | F01D 5/048 |

(Continued)

FOREIGN PATENT DOCUMENTS

| | | |
|---|---|---|
| DE | 102015103670 A1 | 9/2016 |
| DE | 102016112521 A1 | 1/2018 |

(Continued)

*Primary Examiner* — Woody A Lee, Jr.
*Assistant Examiner* — Behnoush Haghighian
(74) *Attorney, Agent, or Firm* — LORENZ & KOPF, LLP

(57) ABSTRACT

A rotor of a fluid machine includes a wheel with a plurality of blades. Furthermore, the rotor includes an inter-blade area defined circumferentially between a first blade and a second blade of the plurality of blades with respect to the axis of rotation. Moreover, the rotor includes a balancing mark on the wheel and within the inter-blade area. The balancing mark is elongate and has a first end and a second end. The first end and the second end are stepped axially into the inter-blade area. The balancing mark extends arcuately between the first end and the second end. The balancing mark has a depth that varies as the balancing mark extends arcuately between the first end and the second end. The balancing mark has a width that varies as the balancing mark extends arcuately between the first end and the second end.

14 Claims, 9 Drawing Sheets

(56) References Cited

U.S. PATENT DOCUMENTS

| | | | |
|---|---|---|---|
| 9,897,107 B2* | 2/2018 | An | F04D 29/284 |
| 10,001,012 B2* | 6/2018 | Scherrer | F01D 5/141 |
| 10,087,762 B2* | 10/2018 | Duong | F01D 5/048 |
| 10,385,864 B2* | 8/2019 | Pham | F01D 5/048 |
| 10,465,713 B2* | 11/2019 | Seike | F04D 29/666 |
| 10,907,654 B2* | 2/2021 | Feustel | G01M 1/34 |
| 10,989,224 B2* | 4/2021 | Roberts | G01M 1/34 |
| 11,135,661 B2* | 10/2021 | Lehmayr | B23C 3/00 |
| 2005/0111971 A1* | 5/2005 | Fukizawa | F04D 29/284 |
| | | | 415/204 |
| 2006/0250033 A1 | 11/2006 | Vasilescu et al. | |
| 2012/0183406 A1* | 7/2012 | Yoshida | F01D 5/048 |
| | | | 416/219 R |
| 2013/0017091 A1* | 1/2013 | Duong | F01D 5/048 |
| | | | 416/193 A |
| 2015/0322793 A1* | 11/2015 | Takabatake | F02C 6/12 |
| | | | 29/889.1 |
| 2015/0361993 A1* | 12/2015 | An | F01D 5/027 |
| | | | 416/61 |
| 2016/0053616 A1* | 2/2016 | Scherrer | F02B 37/00 |
| | | | 416/223 A |
| 2016/0265359 A1* | 9/2016 | Annati | F01D 5/027 |
| 2016/0363134 A1* | 12/2016 | Seike | F04D 29/662 |
| 2017/0074103 A1 | 3/2017 | House | |
| 2018/0313366 A1* | 11/2018 | Lehmayr | B23C 3/00 |
| 2019/0145430 A1* | 5/2019 | Feustel | G01M 1/34 |
| | | | 416/144 |
| 2020/0149553 A1* | 5/2020 | Roberts | G01M 1/34 |
| 2020/0217204 A1* | 7/2020 | Schiebel | F01D 5/048 |
| 2020/0392848 A1* | 12/2020 | Babak | F01D 5/048 |
| 2021/0215172 A1* | 7/2021 | Roberts | F04D 29/662 |

FOREIGN PATENT DOCUMENTS

| | | |
|---|---|---|
| WO | 2012084455 A1 | 6/2012 |
| WO | 2015142517 A1 | 9/2015 |

\* cited by examiner

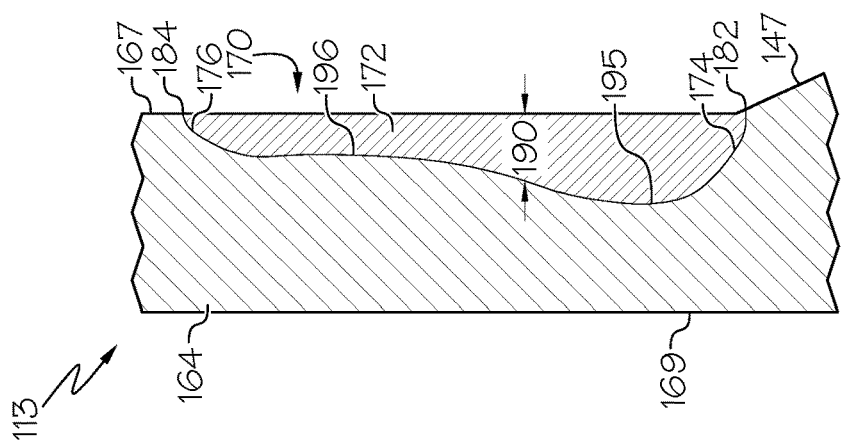
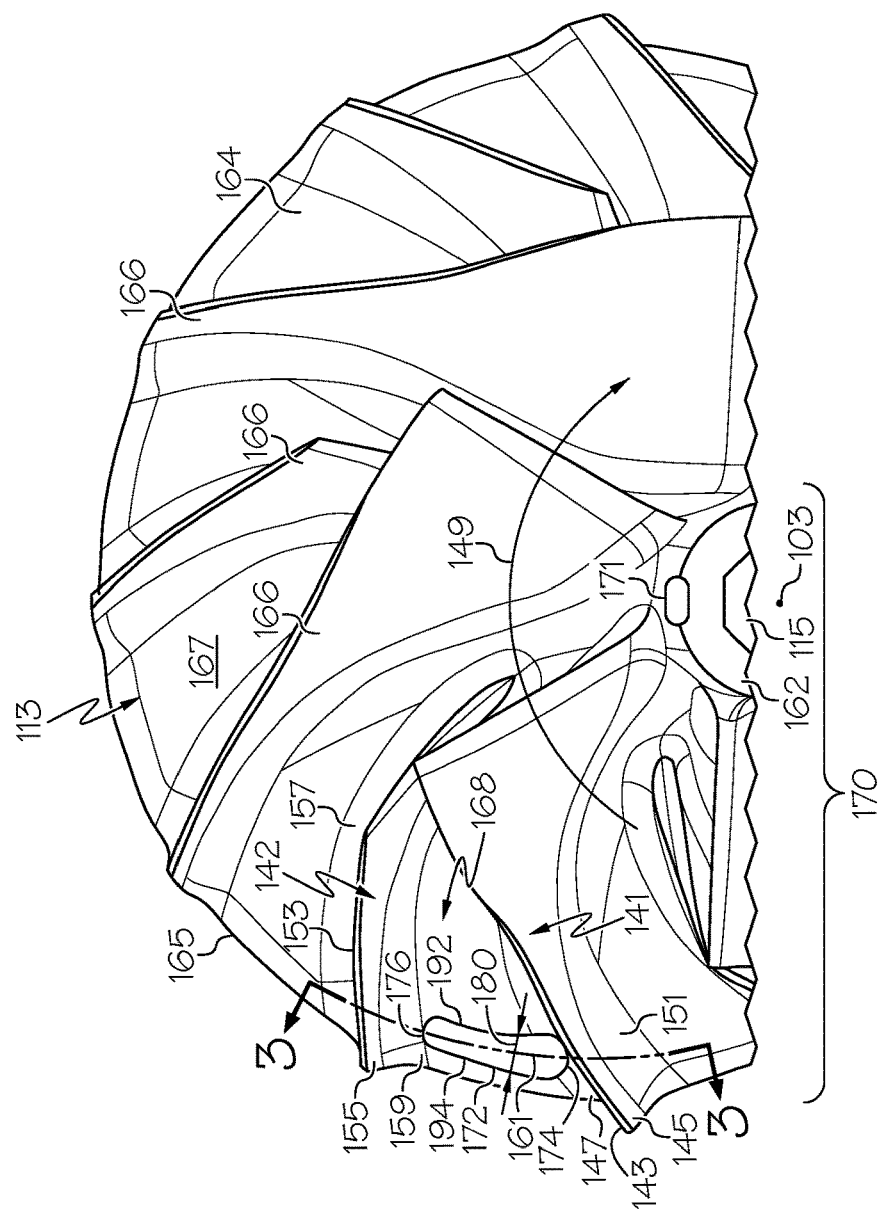

ROTOR WITH BALANCING FEATURES AND BALANCING METHOD

TECHNICAL FIELD

The present disclosure generally relates to a rotor for a rotary machine and, more particularly, relates to a rotor with balancing features and a balancing method for a rotor, such as a rotor of a turbocharger.

BACKGROUND

Fluid machines include a rotor that is supported for rotation therein. The rotor rotates to convert energy of a fluid into mechanical energy or vice versa. For example, vehicle turbochargers include a rotor that rotates within a housing. The rotor may be driven in rotation for boosting the performance of an internal combustion engine. More specifically, these devices can increase the engine's efficiency and power output by forcing extra air into the combustion chamber of an engine.

The rotor preferably may be supported for balanced rotation about a rotation axis. Undesirable vibration or other loads may be reduced if the rotor is sufficiently balanced. However, the balancing method may detrimentally affect the strength or other properties of the rotor. Furthermore, there may be insufficient access to the rotor for performing conventional balancing methods. Also, the balancing method may be difficult, inconvenient, labor-intensive, etc.

Thus, it is desirable to provide a rotor with improved balancing features. It is also desirable to provide a balancing method that accurately and precisely balances the rotor, and that maintains the integrity of the rotor. Furthermore, it is desirable to provide an improved balancing method that is convenient, accurate, and that increases manufacturing efficiency. Other desirable features and characteristics of the present disclosure will become apparent from the subsequent detailed description and the appended claims, taken in conjunction with the accompanying drawings and this background discussion.

BRIEF SUMMARY

In one embodiment, a rotor of a fluid machine is disclosed. The rotor includes a wheel that is supported for rotation about an axis of rotation. The rotor also includes a plurality of blades included on the wheel. Furthermore, the rotor includes an inter-blade area defined circumferentially between a first blade and a second blade of the plurality of blades with respect to the axis of rotation. Moreover, the rotor includes a balancing mark on the wheel and within the inter-blade area. The balancing mark is elongate and has a first end and a second end. The first end and the second end are stepped axially into the inter-blade area. The balancing mark extends arcuately between the first end and the second end. The balancing mark has a depth that varies as the balancing mark extends arcuately between the first end and the second end. The balancing mark has a width that varies as the balancing mark extends arcuately between the first end and the second end.

In addition, a method of balancing a rotor of a fluid machine is disclosed. The method includes supporting a wheel for rotation about an axis of rotation. The wheel includes a plurality of blades. The wheel also includes an inter-blade area defined circumferentially between a first blade and a second blade of the plurality of blades with respect to the axis of rotation. The method further includes forming a balancing mark on the wheel and within the inter-blade area. The balancing mark is elongate and has a first end and a second end. The first end and the second end are stepped axially into the inter-blade area. The balancing mark extends arcuately between the first end and the second end. The balancing mark has a depth that varies as the balancing mark extends arcuately between the first end and the second end. The balancing mark has a width that varies as the balancing mark extends arcuately between the first end and the second end.

In an additional embodiment, a fluid charger device is disclosed. The fluid charger device includes a housing and a rotor supported for rotation within the housing for rotation about an axis of rotation. The fluid charger device also includes a wheel of the rotor including a plurality of blades and defining a direction of rotation about the axis of rotation. The fluid charger device further includes an inter-blade area defined circumferentially between a first blade and a second blade of the plurality of blades with respect to the axis of rotation. Additionally, the fluid charger device includes a balancing mark on the wheel and within the inter-blade area. The balancing mark is elongate and has a first end and a second end. The first end and the second end are stepped axially into the inter-blade area. The balancing mark extends arcuately between the first end and the second end. The balancing mark has a depth that varies as the balancing mark extends arcuately between the first end and the second end. The balancing mark has a width that varies as the balancing mark extends arcuately between the first end and the second end. The first end and the second end are cupped ends. Additionally, the first blade includes a pressure side and the second blade includes a suction side with respect to the direction of rotation. The pressure side faces toward the suction side across the inter-blade area. The first end is disposed proximate the pressure side of the first blade, and the second end is disposed proximate the suction side of the second blade. The first end is deeper and wider than the second end.

BRIEF DESCRIPTION OF THE DRAWINGS

The present disclosure will hereinafter be described in conjunction with the following drawing figures, wherein like numerals denote like elements, and wherein:

FIG. 2 is a front view of a compressor wheel of the rotor of FIG. 1 with a balancing mark according to example embodiments;

FIG. 3 is a cross-sectional view of the compressor wheel taken along the line 3-3 of FIG. 2;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a rotor of a fluid machine, such as a turbocharger or other charger device of a vehicle. The rotor may include a wheel, such as a compressor wheel, that is supported for rotation about an axis of rotation. The wheel may include a plurality of blades that are spaced apart about the axis of rotation. Furthermore, the rotor may include at least one balancing mark, such as a recess, groove, notch, channel, or other aperture, that is included in an inter-blade area of the wheel. The balancing mark may be elongate and may include a defined and shaped first and second end. At least one end may be cupped (i.e., cupped in shape) to include three-dimensional contour and the elongate balancing mark may extend away from the cupped end(s). In some embodiments, both the first end and the second end may be shaped to have cupped, contoured surfaces, and the elongate balancing mark may extend therebetween. The width and/or depth may vary between the first end and the second end. The width, depth, location, and/or other features of the balancing feature may be configured to reduce unbalance of the rotor. In addition, these features may be configured according to predetermined characteristics of the wheel. For example, the width, depth, location, and/or other features may be configured according to a known stress profile of the wheel. In some embodiments, for example, the deepest and/or widest portion of the balancing mark may be disposed proximate a pressure side of one blade whereas the shallower and narrower portions may be disposed proximate a suction side of a neighboring blade. In the embodiments illustrated, there may generally be a higher stress margin at the pressure side; therefore more material may be available for removal without negatively affecting wheel strength, robustness, etc. Furthermore, the balancing mark may be angularly and radially disposed at a predetermined position and may extend along a predetermined area of the wheel. The balancing mark may be located according to the particular characteristics of the wheel. Methods of manufacturing and methods of balancing these rotors are also disclosed according to example embodiments of the present disclosure.

Accordingly, rotors may be accurately and precisely balanced with a balancing mark, aperture, recess, groove, notch, etc. that is tailored for a particular wheel, wheel configuration, etc. The present teachings provide high quality, balanced rotors and highly efficient methods for manufacturing the same.

Figure 1:
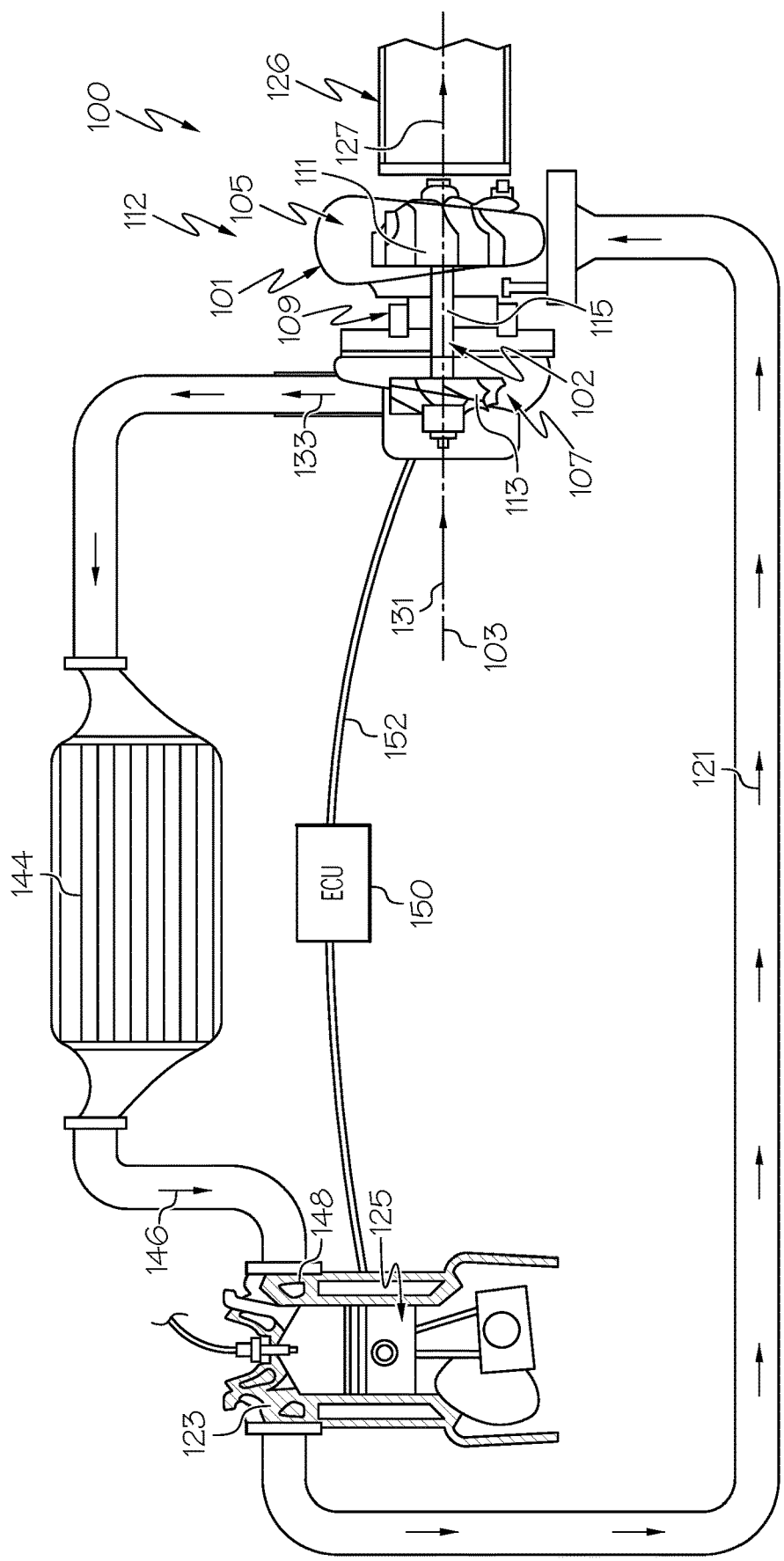
FIG. 1 is a schematic view of a turbocharger system with a rotor that is balanced according to example embodiments of the present disclosure.

FIG. 1 is a schematic view of an example turbocharger system 100 that includes a turbocharger 112. The turbocharger 112 generally includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine (e.g., from an exhaust manifold 123 of an internal combustion engine 125). The turbine wheel 111 and, thus, the rotor 102 are driven in rotation around the axis 103 by the high-pressure and high-temperature exhaust gas stream 121, which becomes a lower-pressure and lower-temperature exhaust gas stream 127 that is released into a downstream exhaust pipe 126. In other embodiments, the engine 125 may be of another type, such as a diesel fueled engine.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream 133 is characterized by an increased temperature, over that of the input air 131.

The pressurized air stream 133 may be channeled through an air cooler 144 (i.e., intercooler), such as a convectively cooled charge air cooler. The air cooler 144 may be configured to dissipate heat from the pressurized air stream 133, increasing its density. The resulting cooled and pressurized output air stream 146 is channeled into an intake manifold 148 of the internal combustion engine 125, or alternatively, into a subsequent-stage, in-series compressor. The operation of the system 100 may be controlled by an ECU 150 (engine control unit) that connects to the remainder of the system via communication connections 152.

Referring now to FIGS. 2 and 3, additional details of the rotor 102 will be discussed according to example embodiments. Specifically, the compressor wheel 113 of the rotor 102 is illustrated according to example embodiments. As will be discussed, the compressor wheel 113 may include one or more balancing features 170 that balance the rotor 102 in rotation about the axis 103. It will be appreciated that one or more balancing features 170 may be included on the rotor 102 in a location other than the compressor wheel 113 without departing from the scope of the present disclosure. Furthermore, it will be appreciated that balancing features 170 may be included on another rotor (e.g., a rotor of a supercharger or e-charger) without departing from the scope of the present disclosure.

In some embodiments, the compressor wheel 113 may be a unitary, one-piece member that is made out of metal or other material. In some embodiments, the compressor wheel 113 may be formed at least partly by a casting process.

As shown, the compressor wheel 113 may include a hub 162. The hub 162 may be cylindrical and may receive the shaft 115 of the rotor 102. The hub 162 may be fixed to the shaft 115 (e.g., with a nut or other fastener) for rotation therewith.

The compressor wheel 113 may also include a back disc 164. The back disc 164 may extend radially away from the hub 162 and may terminate in the radial direction at an outer rim edge 165. The outer rim edge 165 may be substantially circular, may extend continuously about the axis 103, and may be substantially centered on the axis 103. The back disc 164 may also include a front face 167 and a back face 169. Both the front face 167 and the back face 169 may extend radially between the axis 103 and the outer rim edge 165. The back face 169 may generally face toward the turbine wheel 111 of the rotor 102 (FIG. 1), and the front face 167 may face generally in the opposite direction (away from the turbine wheel 111). The front face 167 may be contoured and may extend substantially in the axial direction (i.e., along the axis 103) proximate the hub 162, may extend substantially in the radial direction proximate the outer rim edge 165, and may have a gradual concave contour between the hub 162 and the outer rim edge 165.

The compressor wheel 113 may further include a plurality of blades 166. The blades 166 may be relatively thin and may be attached to the front face 167 of the back disc 164. The blades 166 may project from the front face 167. The blades 166 may also be arranged about the axis of rotation 103 and may radiate outward therefrom. The outer radial ends of the blades 166 may terminate at the outer rim edge 165. The blades 166 may be spaced apart substantially evenly in the circumferential direction about the axis 103. The blades 166 may have a predetermined shape, profile, size, etc. for moving the input air 131 through the compressor housing 107, compressing the input air 131, and creating the pressurized air stream 133 as the rotor 102 rotates about the axis 103.

It will be appreciated that the blades 166 may have a number of different configurations without departing from the scope of the present disclosure. In the illustrated embodiments, for example, the compressor wheel 113 may have a splitter blade wheel configuration where every other blade 166 is shorter than the full blade next to it. Moreover, the blades 166 may have a backward-curved impellor configuration such that at least some of the blades 166 (e.g., the so-called "full blades") curve backward relative to the direction of rotation, which is clockwise as indicated by arrow 149.

The plurality of blades 166 may include a first blade 141 and a neighboring second blade 142. The first blade 141 may be axially longer than the second blade 142 (i.e., may project outward further axially from the back disc 164) in some embodiments. Also, the first blade 141 may include a pressure side 143 and a suction side 145. The wheel 113 may also include a pressure side fillet 147, which may be concave to define a smooth transition between the front face 167 and the pressure side 143 of the first blade 141. Likewise, the wheel 113 may include a suction side fillet 151, which may be concave to define a smooth transition between the front face 167 and the suction side 145 of the first blade 141. Similarly, the second blade 142 may include a pressure side 153 and a suction side 155. There may be a pressure side fillet 157, which may be concave to define a smooth transition between the front face 167 and the pressure side 153 of the second blade 142. Likewise, there may be a suction side fillet 159, which may be concave to define a smooth transition between the front face 167 and the suction side 155 of the second blade 142.

Moreover, the compressor wheel 113 may include a plurality of inter-blade areas defined between neighboring ones of the blades 166 on the front face 167 of the compressor wheel 113. This may include an inter-blade area 168 defined between the first blade 141 and the second blade 142. The inter-blade area 168 may extend radially between the hub 162 and the outer rim edge 165 (i.e., may radiate relative to the axis of rotation 103). Also, the inter-blade area 168 may be contoured along a radiating direction of the wheel 113 (i.e., curved as the area 168 extends radially between the hub 162 and the outer rim edge 165). This contour in the radiating direction may correspond to that of the plurality of blades 166. Moreover, the width of the inter-blade area 168 (measured circumferentially between the first and second blades 141, 142) may be tapered and may increase gradually in the radial direction from the hub 162 to the outer rim edge 165.

In addition, the compressor wheel 113 may include the balancing feature 170. Generally, the balancing feature 170 may distribute the weight of the rotor 102 to cause the center of gravity of the rotor 102 to be located substantially on the axis 103. The balancing feature 170 may ameliorate unbalance due to, for example, stackup of manufacturing and assembly tolerances relating to the rotor 102. Thus, the balancing feature 170 may provide substantially balanced rotation of the rotor 102 about the axis 103. While the balancing feature 170 is included on the compressor wheel 113 in the illustrated embodiments, it will be appreciated that the turbine wheel 111 may include the balancing feature 170 in some embodiments of the present disclosure.

The balancing feature 170 may include one or more marks comprising as a recess, groove, channel, or other aperture. In some embodiments, the back disc 164 may include a first balancing mark 172 (FIGS. 2 and 3) that provides balancing with respect to a first plane (e.g., a plane that is normal to the axis 103). Also, as shown in FIG. 2, the hub 162 may include a second balancing mark 171 that balances the rotor 102 with respect to a plane that is parallel to the axis 103. Thus, the balancing marks 171, 172 may cooperate to provide two-plane balancing for the rotor 102.

As shown in FIGS. 2 and 3, the first balancing mark 172 may comprise an elongated recess, slot, notch, or groove. The first balancing mark 172 may be formed at least partly in the front face 167 of the wheel 113, within the inter-blade area 168. The first balancing mark 172 may be recessed within the front face 167.

As shown in FIG. 2, the balancing mark 172 may extend across the inter-blade area 168 along an axis 161 and may include a first end 174 and a second end 176. The axis 161 may be arcuate and may be centered substantially on the axis 103 so as to be substantially concentric with the outer rim edge 165. The axis 161 may be spaced inwardly in the radial direction at a distance from the outer rim edge 165.

As shown in FIG. 2, the balancing mark 172 may have a width 180 (i.e., a width dimension), which may be measured transverse to the axis 161. The width 180 may be measured in the radial direction relative to the axis 103 between an inboard edge 192 and an outboard edge 194 of the mark 172. As shown in FIG. 2, the width 180 may vary as the balancing mark 172 extends arcuately between the first end 174 and the second end 176.

The balancing mark 172 may have an elongated bean-shape in some embodiments. The inboard edge 192 may be more contoured than the outboard edge 194.

Additionally, as shown in FIG. 2, the first end 174 may be recessed into the pressure side fillet 147. The second end 176 may terminate at or before reaching the suction side fillet 159. In other words, the suction side fillet 159 may be uninterrupted by the second end 176.

The width 180 of the balancing mark 172 may be configured to reduce unbalance of the rotor 102. Furthermore, the width 180 may vary according to a particular stress profile of the wheel 113. For example, there may be more stress margin on the pressure side 143 than on the suction side 155 of the neighboring blade 166. As such, the width 180 may be larger proximate the first end 174 as compared to the second end 176. In other words, there may be more material available for removal at the pressure side 143; therefore, the balancing mark 172 may be wider at the first end 174 without negatively affecting strength or robustness of the wheel 113.

Additionally, as shown in FIG. 3, the balancing mark 172 may have a depth 190 (i.e., a depth dimension), which may be measured substantially in an axial direction along the axis 103. The depth 190 may be measured in the axial direction and may be the distance recessed from the front face 167, in areas adjacent the balancing mark 172. As shown in FIG. 3, the depth 190 may vary as the balancing mark 172 extends arcuately between the first end 174 and the second end 176.

The depth 190 of the balancing mark 172 may be configured to reduce unbalance of the rotor 102. In addition, the depth 190 may vary according to a particular stress profile of the wheel 113. As mentioned, there may be more stress margin on the pressure side 143 than on the suction side 155. As such, the depth 190 may be larger proximate the first end 174 as compared to the second end 176. Also, as shown in FIG. 3, the depth 190 may vary to define a first segment 195 and a second segment 196. The second segment 196 may be shallower than the first segment 195.

Also, as shown in FIG. 3, the first end 174 may be a cupped end (i.e., cupped in shape). In other words, the first end 174 may have a hemispherical or ball-segment-shaped concave contour on its outer edge, except where the mark 172 extends from the first end 174 toward the second end 176. Likewise, the second end 176 may be a cupped end (i.e., cupped in shape). As such, the second end 176 may have a hemispherical or ball-segment-shaped concave contour on its outer edge, except where the mark 172 extends from the second end 176 toward the first end 174. Both the first end 174 and the second end 176 may be cupped in shape. The depth 190 of the mark 172 may vary between the cupped first end 174 and cupped second end 176. As shown in FIG. 3, there may be a first step 182 at the transition between the front face 167 and the cupped, contoured surface of the first end 174. Likewise, there may be a second step 184 at the transition between the front face 167 and the contoured surface of the second end 176. The balancing mark 172 may be stepped in the axial direction along the axis 103 at the steps 182, 184, and the inboard edge 192 and the outboard edge 194 may be continuous with the edge defined at the first step 1823 and the second step 184.

Accordingly, the mark 172 may be shaped along its elongate length to a high degree of precision and accuracy.

The width 180 and depth 190 may vary as a function of the angular position within the inter-blade area 168. Both ends 174, 176 may be shaped to a high degree of contour in some embodiments to precisely balance the rotor 102 while also retaining high strength and robustness of the wheel 113. The balancing mark 172 may be tailored for a particular wheel 113, for a particular wheel configuration, for a particular stress profile of the wheel 113, etc.

Moreover, the location of the mark 172 may be advantageous because it is highly accessible (e.g., during a machining process). Also, there is a relatively large amount of area for the balancing mark 172 at this location. Therefore, the balancing procedure may be performed with high precision and accuracy.

Figure 4:
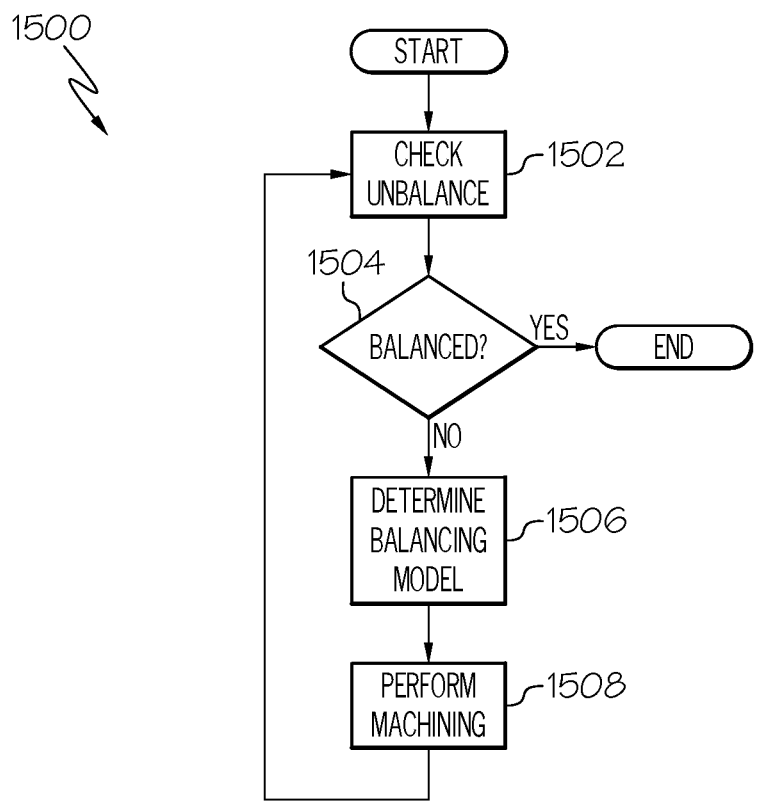
FIG. 4 is a flowchart illustrating a method of balancing the rotor of FIGS. 2 and 3 according to example embodiments.

Referring now to FIG. 4, a method 1500 of balancing the rotor 102 and forming the balancing mark 172 will be discussed according to example embodiments of the present disclosure. In some embodiments, a balancing apparatus 1600 (FIG. 5) may be employed for performing the method 1500.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the air quality control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 5:
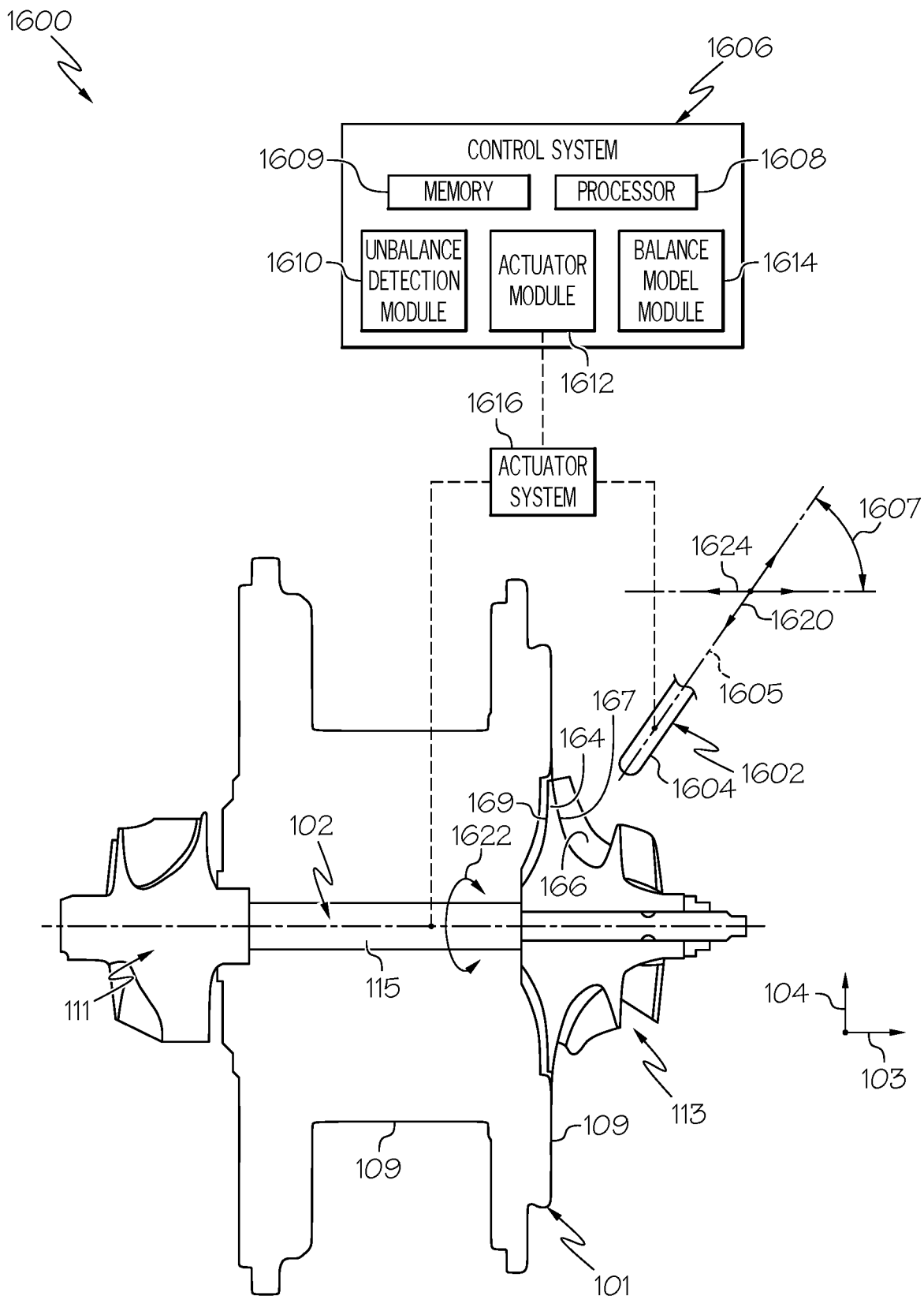
FIG. 5 is a schematic view of a balancing system used to balance the rotor of FIGS. 2-3 according to example embodiments.

As shown in FIG. 5, the balancing apparatus 1600 may support the rotor 102 for rotation about the axis 103. The rotor 102 may be supported within the bearing housing 109 when performing the balancing method 1500. More specifically, as shown in FIG. 5, the rotor 102 may include the compressor wheel 113, the shaft 115, and the turbine wheel 111. The rotor 102 may be supported on one or more bearings and may be provided within the bearing housing 109. The front face 167 of the compressor wheel 113 may remain exposed outside the bearing housing 109 during the balancing method 1500.

The balancing apparatus 1600 may also include a cutting tool 1602. The cutting tool 1602 may be one of a variety of tools used to remove material from a workpiece. For example, as shown in FIG. 5, the cutting tool 1602 may include a cutter 1604, such as a ball-end or hemispherical milling cutter. The cutter 1604 may have any suitable radius and may be operatively connected to a milling machine. However, it will be appreciated that the method 1500 may be employed using a different cutting tool 1602 without departing from the scope of the present disclosure.

The balancing apparatus 1600 may further include a control system 1606. The control system 1606 may be configured as a computing device with at least one processor 1608 and memory device 1609. The control system 1606 may be in communication with an actuator system 1616. The control system 1606 may include a hard-wired computing circuit (or circuits). The control system 1606 may also be configured as a hydraulic, electrical or electro-hydraulic controller, or otherwise. As such, the control system 1606 may be configured to execute various computational and control functionality with respect to the actuator system 1616.

The actuator system 1616 may include one or more electric motors, hydraulic actuators, pneumatic actuators, etc. In some embodiments, the actuator system 1616 may selectively actuate the rotor 102 relative to the cutter 1604. For example, the actuator system 1616 may selectively rotate the rotor 102 about the axis 103 as indicated by arrow 1622. In some embodiments, the actuator system 1616 may selectively rotate the rotor 102 in either the clockwise or counterclockwise direction. Additionally, the actuator system 1616 may selectively actuate the cutter 1604 relative to the rotor 102. For example, the actuator system 1616 may selectively rotate the cutter 1604 about a cutter axis 1605. In some embodiments, the cutter axis 1605 may be disposed at an acute angle 1607 relative to the axis 103 of the rotor 102. (The cutter axis 1605 may lie within the plane of FIG. 5.) Additionally, the actuator system 1616 may actuate the cutter 1604 linearly (telescopingly) back and forth along the cutter axis 1605 as indicated by arrow 1620. Furthermore, the actuator system 1616 may selectively move the cutter 1604 linearly along and substantially parallel to the axis 103 of the rotor 102 as indicated by arrow 1624.

The control system 1606 may include various modules. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In some embodiments, the control system 1606 may include an actuator module 1612. The actuator module 1612 may be used to generate and output control signals or control commands to the actuator system 1616 for selectively moving the cutter 1604 relative to the rotor 102 and/or selectively moving the rotor 102 relative to the cutter 1604. The control system 1606 may further include an unbalance detection module 1610. The unbalance detection module 1610 may be used for detecting that the rotor 102 is unbalanced for rotation about the axis 103. The unbalance detection module 1610 may also detect an amount or degree to which the rotor 102 is unbalanced. In some embodiments, the unbalance detection module 1610 may be operatively connected to a sensor, such as a vibration sensor, that detects unbalance in the rotation of the rotor 102 during rotation. Moreover, the control system 1606 may include a balance model module 1614. The balance model module 1614 may be used to generate an electronic (computerized) module of the rotor 102 with balancing marks 172 suitable for balancing the rotor 102. The module 1614 may determine the width 180, depth 190, location, and/or other characteristics of the balancing mark 172. The module 1614 may determine these characteristics for sufficiently balancing the rotation of the rotor 102, while also considering the stress profile of the wheel 113. Once the module 1614 generates the model, it may be saved in the memory device 1609.

As shown in FIG. 4, the method 1500 may begin at 1502 at which an unbalance test of the rotor 102 is performed. For example, the actuator module 1612 may generate a control command for rotating the rotor 102 about the axis 103. The rotor 102 may be rotated continuously for a predetermined amount of time and at a predetermined angular velocity. Meanwhile, one or more vibration sensors may detect the amount of vibration in the rotor 102. The unbalance detection module 1610 may receive vibration data from the sensors and process the signal and calculate and determine the unbalance in the rotor 102.

Next, at 1504 of the method 1500, the control system 1606 may determine whether the rotor 102 is sufficiently balanced. For example, the unbalance detected at 1502 may be compared to a predetermined threshold amount of unbalance. This predetermined threshold may be stored in the memory device 1609 and may be accessed by the control system 1606 when making the determination of 1504. If the amount of unbalance detected at 1502 is below the predetermined threshold (i.e., rotor is sufficiently balanced), then the method may terminate as shown in FIG. 4. In contrast, if at 1504 the control system 1606 determines that the detected unbalance is above the threshold, then the method 1500 may continue at 1506.

At 1506, the balance model module 1614 may be used to generate a computer model of the rotor 102 with one or more balancing marks 172 suitable for balancing the rotation of the rotor 102. The balance model module 1614 may rely on computerized logic and modeling software to determine the size, dimension, etc. of the balancing mark(s) 172 as well as the placement of such mark(s) 172 on the compressor wheel 113. The marks 172 generated in the model may be sized, shaped, and placed on the compressor wheel 113 as discussed above with respect to FIGS. 2 and 3 in some embodiments.

The model may also be generated to indicate how the actuator system 1616 should be used to form the mark 172. In other words, the model may be used to generate control signals for the actuator system 1616 for moving the cutter 1604 and/or the wheel 113 for forming the mark 172. Once the balance model module 1614 generates the model of the balanced rotor 102, the model may be saved in the memory device 1609. It will be appreciated that the model may also dictate the process steps for creating the balancing marks 172.

Next, at 1508 of the method 1500, the rotor 102 may be machined to create the balancing marks 172 according to the model generated at 1506. Specifically, the actuator module 1612 may access the model (generated at 1506 and saved in the memory device 1609) and actuate the rotor 102 and/or the cutter 1604 according to the model.

Figure 6:
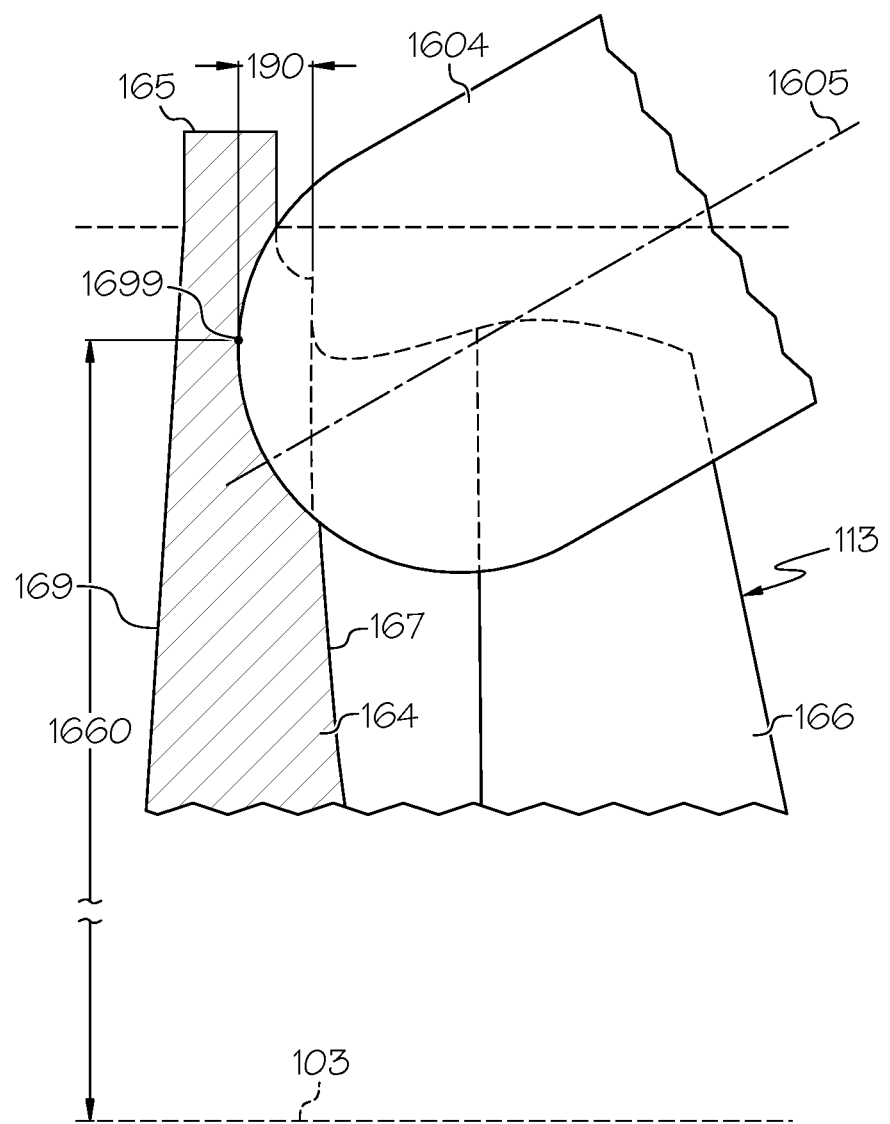
FIG. 6 is a schematic side view of the compressor wheel and a cutting tool for forming the balancing feature according to example embodiments.

The actuator module 1612 may generate control signals for rotating the cutter 1604 about the cutter axis 1605 at a predetermined angular speed according to the model. The actuator module 1612 may also generate and send control commands to the cutter 1604 for moving the cutter 1604 along the cutter axis 1605 (at least partly along the axis 103) and to position the cutter 1604 at a radial distance 1660 away from the axis 103 according to the model generated at 1506. The actuator module 1612 may also generate control commands for moving the cutter 1604 parallel to the axis 103 toward the wheel and to a predetermined depth 190 into the back disc 164 of the compressor wheel 113 according to the model. This movement may cause the cutter 1604 to contact and cut material away from the compressor wheel 113 as represented in FIG. 6.

Moreover, control commands may be generated for moving the cutter 1604 axially (parallel to the axis 103, along the axis, etc.) and away from the back disc 164, for example, at the first end 174 or the second end 176. In so doing, the cutter 1604 may shape the cupped first end 174 and/or the cupped second end 176 before being withdrawn from the wheel 113.

Figure 7:
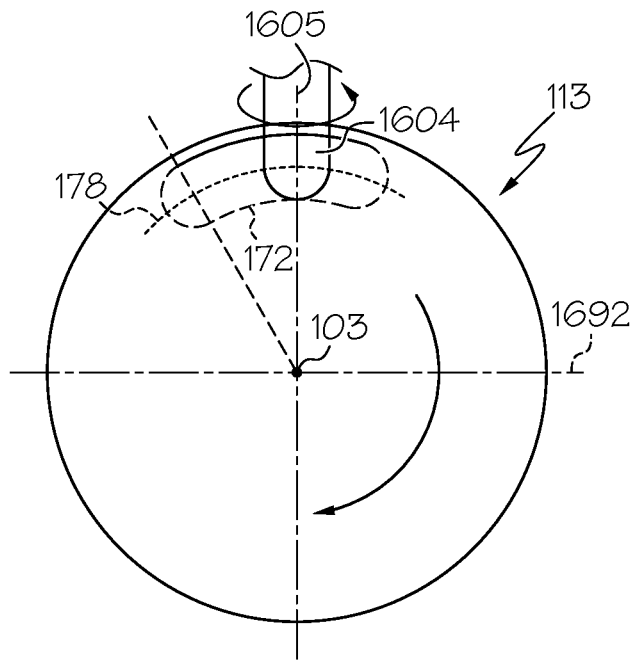
FIG. 7 is a schematic end view of the compressor wheel and cutting tool according to example embodiments.
Figure 8:
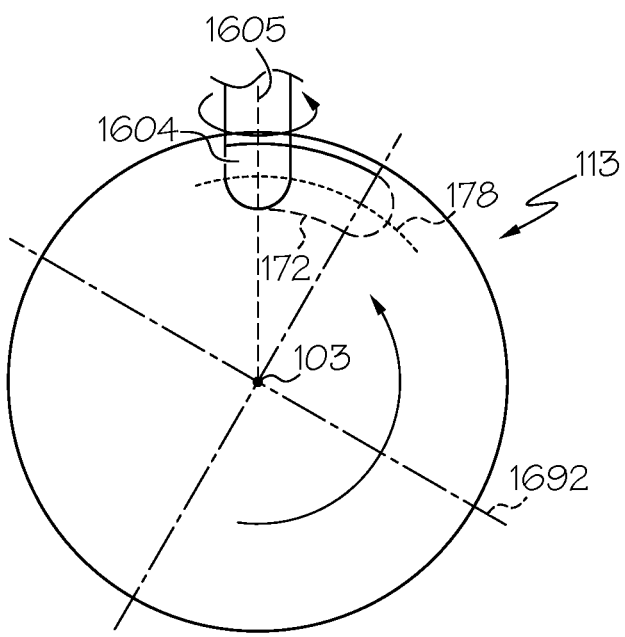
FIG. 8 is a schematic end view of the compressor wheel and cutting tool according to additional example embodiments.

Furthermore, as shown in FIGS. 7 and 8, the actuator module 1612 may generate control commands for rotating the rotor 102 about the axis 103 for a predetermined amount of angular displacement according to the model. In some embodiments illustrated in FIG. 7, the compressor wheel 113 may be rotated clockwise about the axis 103. In additional embodiments illustrated in FIG. 8, the compressor wheel 113 may be rotated counterclockwise about the axis 103. Furthermore, in some embodiments, the cutter 1604 may remain at a fixed angular location relative to the axis 103 during the machining process. Additionally, the cutter 1604 and/or the wheel 113 may be moved axially simultaneously while the compressor wheel 113 is rotated according to the model generated at 1506. This may provide the varying width 180 and depth 190 discussed above.

In some embodiments, the entire mark 172 may be created in a single pass with the cutter 1604 and wheel 113 moving relative to each other in both the axial direction and the angular (circumferential) direction. Accordingly, the mark 172 may be formed in a highly efficient manner. However, in other embodiments, the mark 172 may be created through multiple passes of the cutter 1604, and the cutter 1604 may be progressively moved deeper and deeper into the back disc 164 for each pass until the mark 172 is fully formed.

Once the mark 172 is formed at 1508, the method 1500 may loop back to 1502, where the unbalance of the wheel 113 may be re-checked. Then, at 1504, if it is determined that the wheel 113 is sufficiently balanced, then the method 1500 may terminate. However, if the wheel 113 shows significant unbalance, then the method 1500 may continue to 1506, where an updated model may be generated, and then the mark 172 may be re-shaped and/or a new mark 172 may be added to the wheel 113. The method 1500 may continue until the wheel 113 is sufficiently balanced.

Accordingly, rotors of fluid machines may be accurately and precisely balanced according to the present teachings in an efficient and repeatable fashion. Balancing marks may be formed and shaped to be tailor-made for the wheel 113 without compromising wheel strength and robustness.

Figure 9:
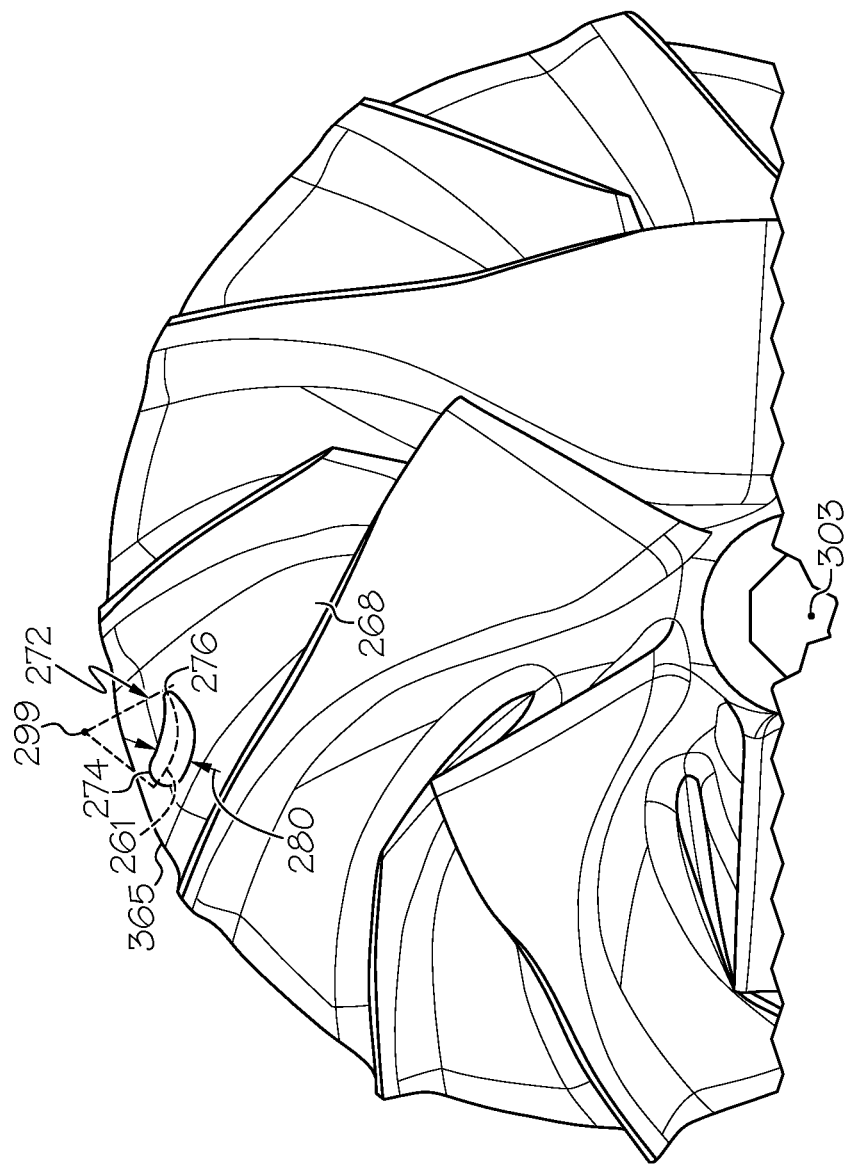
FIG. 9 is a front view of the compressor wheel of the rotor of FIG. 1 with a balancing mark according to additional example embodiments of the present disclosure.

Additional embodiments are illustrated in FIG. 9. (Features that correspond to those of FIGS. 1-3 are indicated with corresponding reference numbers increased by 100.) The mark 272 may extend along its arcuate axis 261 within the inter-blade area 268 between the first end 274 and the second end 276. The mark 272 may be substantially centered on the axis 261. Also, in some embodiments, the width 280 may vary as the mark 272 extends along the axis 261 between the first end 274 and the second end 276. Moreover, like the embodiments of FIG. 3, the depth of the mark 272 may vary as the mark 272 extends along the axis 261 between the first end 274 and the second end 276. Furthermore, both the first end 274 and the second end 276 may be cupped in shape in some embodiments, similar to the embodiments discussed above in relation to FIG. 3.

The arcuate axis 261 may be arcuate such that the mark 272 bows and curves along the inter-blade area 268. For reference purposes, the arcuate axis 261 may curve and arc with respect to a second axis 299. In some embodiments, the arcuate axis 261 of the mark 272 may be circular and centered about the second axis 299. Also, the second axis 299 may be misaligned with the axis of rotation 203. The axis 299 may be parallel to the axis of rotation 203; however, the axis 299 may be spaced apart at a radial distance therefrom. However, it will be appreciated that the mark 272 may arc along a non-circular path with respect to the axis 299 in other embodiments of the present disclosure.

Furthermore, the arcuate axis 261 may bow, arc, or bend with respect to the outer rim edge 265. For example, the arcuate axis 261 may bow inwardly from the adjacent portion of the outer rim edge 265 and slightly toward the axis of rotation 203. Also, as shown in the illustrated embodiment, the first end 274 may be disposed further outward radially from the axis of rotation 203 as compared to the second end 276. The balancing mark 272 may be routed along areas of the wheel that are generally subject to less stress, that include more material available for removal, etc.

Figure 10:
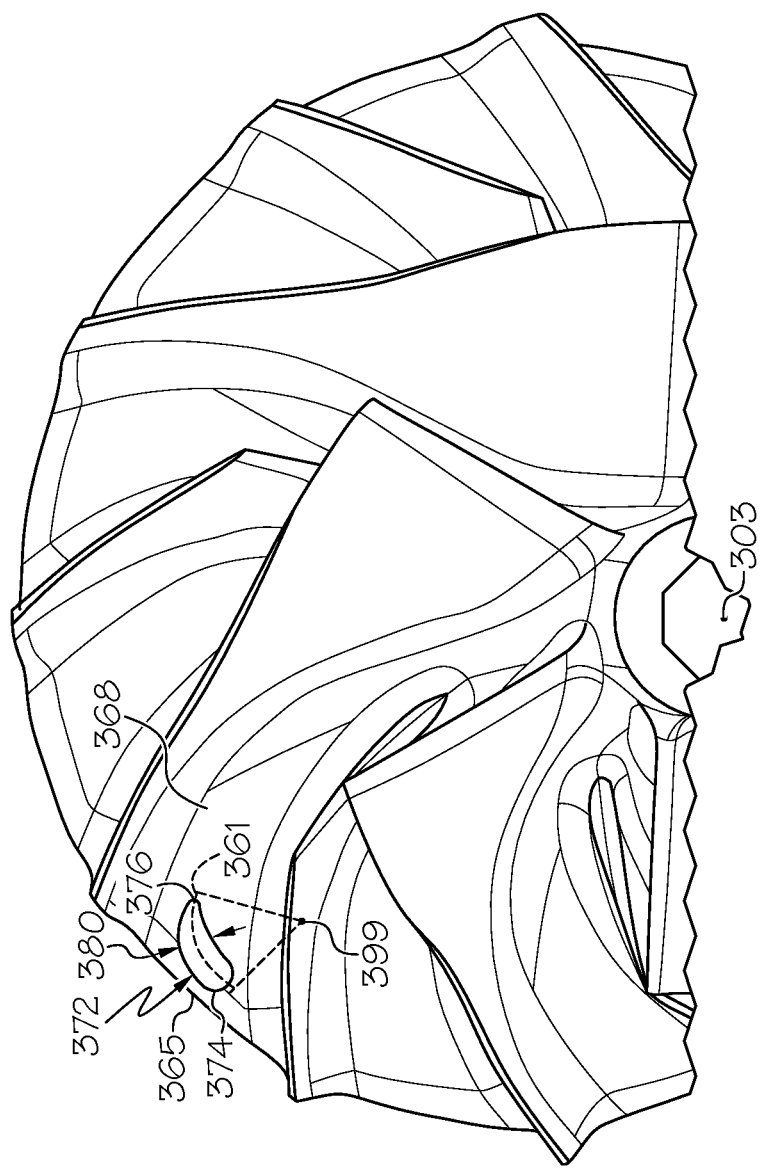
FIG. 10 is a front view of the compressor wheel of the rotor of FIG. 1 with a balancing mark according to additional example embodiments of the present disclosure.

Further embodiments are illustrated in FIG. 10. (Features that correspond to those of FIGS. 1-3 are indicated with corresponding reference numbers increased by 200.) The mark 372 may extend along its arcuate axis 361 within the inter-blade area 368 between the first end 374 and the second end 376. Also, in some embodiments, the width 380 may vary as the mark 372 extends along the axis 361 between the first end 374 and the second end 376. Moreover, like the embodiments of FIG. 3, the depth of the mark 372 may vary as the mark 372 extends along the axis 361 between the first end 374 and the second end 376. Furthermore, both the first end 374 and the second end 376 may be cupped in shape in some embodiments, similar to the embodiments discussed above in relation to FIG. 3.

The arcuate axis 361 may be arcuate with respect to a second axis 399. In some embodiments, the axis 361 may be centered about the second axis 399. Also, the second axis 399 may be misaligned with the axis of rotation 303. The axis 399 may be parallel to the axis of rotation 303; however, the axis 399 may be spaced apart at a radial distance therefrom.

Furthermore, the arcuate axis 361 may bow outwardly toward an adjacent portion of the outer rim edge 365 of the wheel with the first end 374 disposed further outward radially from the axis of rotation 303 as compared to the second end 376. Moreover, the arcuate axis 361 be bowed generally in the same direction as the contour of the blades and the inter-blade area 368. The balancing mark 372 may be routed along areas of the wheel that are generally subject to less stress, that include more material available for removal, etc.

Figure 11:
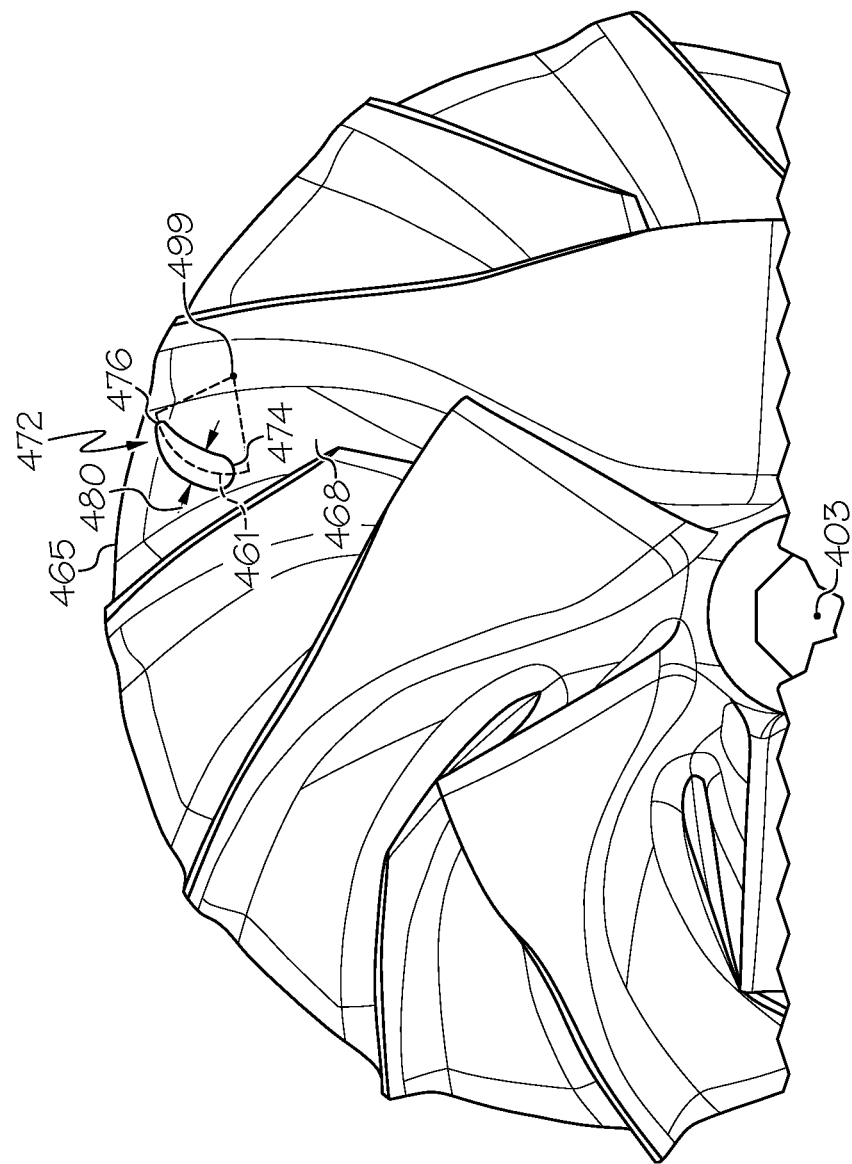
FIG. 11 is a front view of the compressor wheel of the rotor of FIG. 1 with a balancing mark according to additional example embodiments of the present disclosure.

Additional embodiments are illustrated in FIG. 11. (Features that correspond to those of FIGS. 1-3 are indicated with corresponding reference numbers increased by 300.) The mark 472 may extend along its arcuate axis 461 within the inter-blade area 468 between the first end 474 and the second end 476. Also, in some embodiments, the width 480 may vary as the mark 472 extends along the axis 461 between the first end 474 and the second end 476. Moreover, like the embodiments of FIG. 3, the depth of the mark 472 may vary as the mark 472 extends along the axis 461 between the first end 474 and the second end 476. Furthermore, both the first end 474 and the second end 476 may be cupped in shape in some embodiments, similar to the embodiments discussed above in relation to FIG. 3.

The arcuate axis 461 may be arcuate with respect to a second axis 499. In some embodiments, the axis 461 may be centered about the second axis 499. Also, the second axis 499 may misaligned with the axis of rotation 403. The axis 499 may be parallel to the axis of rotation 403; however, the axis 499 may be spaced apart at a radial distance therefrom.

Furthermore, the arcuate axis 461 may bow outwardly toward an adjacent portion of the outer rim edge 465 of the wheel. Also, the arcuate axis 461 may bow opposite the direction of rotation of the wheel as shown. Additionally, as shown in the illustrated embodiment, the first end 474 may be disposed further inward radially from the axis of rotation 403 as compared to the second end 476. The balancing mark 472 may be routed along areas of the wheel that are generally subject to less stress, that include more material available for removal, etc. Thus, in some embodiments, the first end 474 may define the deepest portion of the mark 472, and the mark 472 may get progressively shallower until it terminates at the shaped second end 476.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A rotor of a fluid machine comprising:
   a wheel that is supported for rotation about an axis of rotation, the wheel extending outward in a radial direction from the axis of rotation and terminating at an outer rim edge of the wheel;
   a plurality of blades included on the wheel;
   an inter-blade area with an inter-blade area surface defined circumferentially between a first blade and a second blade of the plurality of blades with respect to the axis of rotation; and
   a balancing mark on the wheel and recessed in an axial direction along the axis of rotation into the inter-blade area surface, the balancing mark defined by an outer perimeter edge that is continuous at the inter-blade area surface, the balancing mark defined by a smooth interior surface that is bordered by the outer perimeter edge, the balancing mark being elongate and arcuate along a length direction directed between a first end and a second end of the balancing mark, the first end and the second end defining respective portions of the outer perimeter edge, the balancing mark having a depth measured in the axial direction, the depth varying gradually as the balancing mark extends in the length direction, the balancing mark having a width measured across the balancing mark in a width direction that is transverse to axis of rotation and the length direction, the width varying gradually as the balancing mark extends in the length direction, an entirety of the outer perimeter edge of the balancing mark being spaced apart inwardly in the radial direction from the outer rim edge.

2. The rotor of claim 1, wherein the first blade includes a pressure side, and the second blade includes a suction side, the pressure side facing toward the suction side across the inter-blade area;
   wherein the first end is disposed proximate the pressure side of the first blade, and wherein the second end is disposed proximate the suction side of the second blade; and
   wherein the depth at the first end is greater than the depth at the second end.

3. The rotor of claim 2, wherein the depth of the balancing mark is greatest at the first end.

4. The rotor of claim 2, wherein the wheel includes a first fillet at a transition between the inter-blade area and the first blade, wherein the wheel includes a second fillet at another transition between the inter-blade area and the second blade; and
   wherein the first end is recessed into the first fillet; and
   wherein the second fillet is uninterrupted by the second end.

5. The rotor of claim 2, wherein the wheel includes a first fillet at a transition between the inter-blade area and the first blade, wherein the wheel includes a second fillet at another transition between the inter-blade area and the second blade;
   wherein the first fillet is uninterrupted by the first end; and
   wherein the second fillet is uninterrupted by the second end.

6. The rotor of claim 1, wherein the balancing mark extends in the length direction along an arcuate axis between the first end and the second end; and
   wherein the arcuate axis is centered substantially on the axis of rotation.

7. The rotor of claim 1, wherein the balancing mark extends in the length direction along an arcuate axis between the first end and the second end; and
   wherein the arcuate axis is off-center with respect to the axis of rotation.

8. The rotor of claim 7, wherein the wheel defines a direction of rotation about the axis of rotation, wherein the arcuate axis is bowed between the first end and the second end, and wherein the arcuate axis is bowed along the direction of rotation.

9. The rotor of claim 7, wherein the wheel defines a direction of rotation about the axis of rotation, wherein the arcuate axis is bowed between the first end and the second end, and wherein the arcuate axis is bowed opposite the direction of rotation.

10. The rotor of claim 7, wherein the wheel includes an outer rim edge with a portion that is adjacent the balancing mark;
    wherein the arcuate axis is bowed between the first end and the second end, and wherein the arcuate axis is bowed toward the portion of the outer rim edge.

11. The rotor of claim 7, wherein the wheel includes an outer rim edge with a portion that is adjacent the balancing mark;
    wherein the arcuate axis is bowed between the first end and the second end, and wherein the arcuate axis is bowed away from the portion of the outer rim edge.

12. A fluid charger device comprising:
    a housing;
    a rotor supported for rotation within the housing for rotation about an axis of rotation;
    a wheel of the rotor with a face that extends out in a radial direction from the axis of rotation and terminates in the radial direction at an outer rim edge of the wheel, the wheel including a plurality of blades that extend from the face, the wheel defining a direction of rotation about the axis of rotation;
    an inter-blade area of the face with an inter-blade area surface defined circumferentially between a first blade and a second blade of the plurality of blades with respect to the axis of rotation; and a balancing mark recess on the face of the wheel and within the inter-blade area, the balancing mark recess being recessed in an axial direction along the axis of rotation into the inter-blade area surface, the balancing mark recess defined by an outer perimeter edge that is continuous at the inter-blade area surface, the balancing mark recess defined by a smooth interior surface that is bordered by the outer perimeter edge, the outer perimeter edge including an inboard edge portion and an outboard edge portion, the balancing mark recess being elongate and arcuate along a length direction directed between a first end and a second end of the balancing mark recess, the first end and the second end spaced apart across the face, the first end and the second end being recessed and defining respective portions of the outer perimeter edge, the balancing mark recess having a depth that is measured in the axial direction from a surrounding area of the face surrounding the balancing mark recess, the depth varying gradually as the balancing mark recess extends in the length direction the balancing mark recess having a width that is measured in the radial direction between the inboard edge portion and the outboard edge portion, the width varying gradually as the balancing mark recess extends in the length direction the first end and the second end being cupped, an entirety of the outer perimeter edge of the balancing mark recess being spaced apart inwardly in the radial direction from the outer rim edge of the wheel;

the first blade including a pressure side and the second blade includes a suction side with respect to the direction of rotation, the pressure side facing toward the suction side across the inter-blade area, the first end being disposed proximate the pressure side of the first blade, and the second end being disposed proximate the suction side of the second blade, the depth at the first end being greater than the depth at the second end, and the width at the first end being greater than the width at the second end; and the balancing mark recess extending in the length direction along an arcuate axis between the first end and the second end, and the arcuate axis being centered substantially on the axis of rotation.

13. The fluid charger device of claim 12, wherein the wheel includes a first fillet at a transition between the inter-blade area and the first blade, wherein the wheel includes a second fillet at another transition between the inter-blade area and the second blade; and wherein the first end is recessed into the first fillet; and wherein the second fillet is uninterrupted by the second end.

14. The fluid charger device of claim 12, wherein the wheel includes a first fillet at a transition between the inter-blade area and the first blade, wherein the wheel includes a second fillet at another transition between the inter-blade area and the second blade;

wherein the first fillet is uninterrupted by the first end; and wherein the second fillet is uninterrupted by the second end.

* * * * *